UNITED STATES PATENT OFFICE.

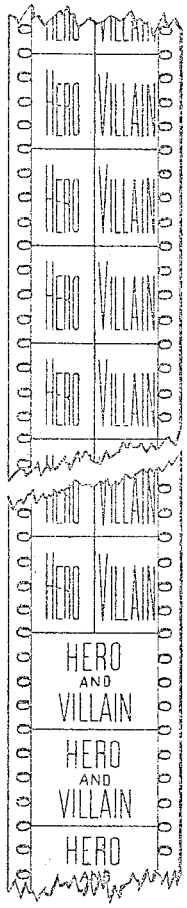

MELVILLE W. THOMPSON, OF NEW YORK, N. Y.

MOTION-PICTURE.

1,292,388.

Specification of Letters Patent.   Patented Jan. 21, 1919.

Application filed December 1, 1915.   Serial No. 64,404.

*To all whom it may concern:*

Be it known that I, MELVILLE W. THOMPSON, of New York, in the county of New York, and in the State of New York, have invented a certain new and useful Improvement in Motion-Pictures, and do hereby declare that the following is a full, clear, and exact description thereof.

My invention relates to motion pictures and has for its object to provide a simultaneous representation of different subjects which may or may not be related.

Other and further objects of my invention will be apparent from the following description thereof and from the accompanying drawings, in which:

Figure 1 is a representation of a motion picture film illustrating one embodiment of my invention.

Referring to the drawings, Fig. 1 represents a motion picture film of standard size, perforated in the usual manner, and having thereon two series of representations, side by side with respect to the direction of movement of the film, of which one series is marked "Hero" and the other series "Villain". These series are related to the same story, it being the purpose to show at the same time two different but related scenes from the same story, as for example, what the hero of the story is doing at a certain time and what the villain of the story is doing at the same time or at a time having a plot relation to the development of the story. That is, the different chain of events of the plot or story develop simultaneously in sight of the audience with a view to merging in the climax. This obviates the present method of showing first what the hero is doing, then changing to show what the villain or some other character is doing, and then changing again to the hero, to form a completed story, but enables the audience to see simultaneously the development of the plot with what is transpiring in relation thereto.

It is obvious that as many scenes of any kind may be provided as desired, and that the film may be of any size and arrangement, with perforations at the sides, in the center, or at any other suitable place, it being the object to provide a simultaneous representation of different subjects, without limitation as to shape or size of the film by means of which the representation is recorded and exhibited.

Many modifications of my invention will be apparent to those skilled in the art without departing therefrom or from the scope of the claims.

What I claim is:

1. The method of representing a complete plot, which consists in simultaneously showing separate pictures, of sets of pictures respectively depicting events in different chains of events leading up to a climax, and then showing such climax.

2. A motion picture film having a plurality of sets of pictures running lengthwise of the film, each of said sets progressively depicting a distinct chain of events leading up to a climax, said film also having a set of pictures depicting such climax and which follow said first mentioned sets of pictures.

In testimony that I claim the foregoing I have hereunto set my hand.

MELVILLE W. THOMPSON.

Witnesses:
EDWIN G. PRINDLE,
MARY L. GLASS.